United States Patent [19]

Kettenbach

[11] Patent Number: 5,330,660
[45] Date of Patent: Jul. 19, 1994

[54] METHOD FOR EVACUATING FLOATING SLUDGE FROM SETTLING TANKS AND THICKENER TANKS

[75] Inventor: Karl Kettenbach, Aarbergen, Fed. Rep. of Germany

[73] Assignee: Passavant-Werke AG, Fed. Rep. of Germany

[21] Appl. No.: 939,512

[22] Filed: Sep. 3, 1992

[30] Foreign Application Priority Data

Sep. 9, 1991 [DE] Fed. Rep. of Germany ....... 4129748

[51] Int. Cl.⁵ .................. B01D 21/30; B01D 21/04
[52] U.S. Cl. ......................... 210/741; 210/91; 210/121; 210/523; 210/525; 210/800
[58] Field of Search ............... 210/86, 90, 91, 121, 210/242.1, 523, 525, 527, 528, 530, 531, 741, 744, 776, 800

[56] References Cited

U.S. PATENT DOCUMENTS

| | | | |
|---|---|---|---|
| 2,086,730 | 7/1937 | Miick | 210/523 |
| 2,695,710 | 11/1954 | Gibbs | 210/523 |
| 2,713,026 | 7/1955 | Kelley et al. | 210/528 |
| 2,822,928 | 2/1958 | Wormser et al. | 210/523 |
| 3,890,289 | 6/1975 | Johnson | 210/104 |
| 3,919,090 | 11/1975 | Shaffer | 210/523 |
| 4,094,338 | 6/1978 | Bauer | 210/242.1 |

FOREIGN PATENT DOCUMENTS

| | | | |
|---|---|---|---|
| 1584976 | 12/1969 | Fed. Rep. of Germany | 210/523 |
| 2904838 | 8/1980 | Fed. Rep. of Germany | 210/531 |
| 3443309 | 5/1986 | Fed. Rep. of Germany | 210/523 |
| 802201 | 2/1981 | U.S.S.R. | 210/528 |

Primary Examiner—Joseph W Drodge
Attorney, Agent, or Firm—Larson and Taylor

[57] ABSTRACT

The new floating sludge evacuating unit for circular tanks having a drain, and a scraper blade movable in relation thereto is characterized in that the scraper blade is lifted repeatedly in order to evacuate the tank surface by sections, advanced to a position remote from the drain where it is stopped and lowered, while the drain follows the scraper blade and pushes the floating sludge together, and that prior to the lowering motion causing the floating sludge to be evacuated a pushdown unit causes the intake edge of the drain to be pre-lowered to a position which takes the level in the tank into account. Then, the lowering path for floating sludge evacuation will always be correct, and evacuation of water will be avoided. A scraper blade interacting with several stationary drains is operating according to the same principle. It is lowered behind every drain and pushes the floating sludge toward the next drain.

11 Claims, 4 Drawing Sheets

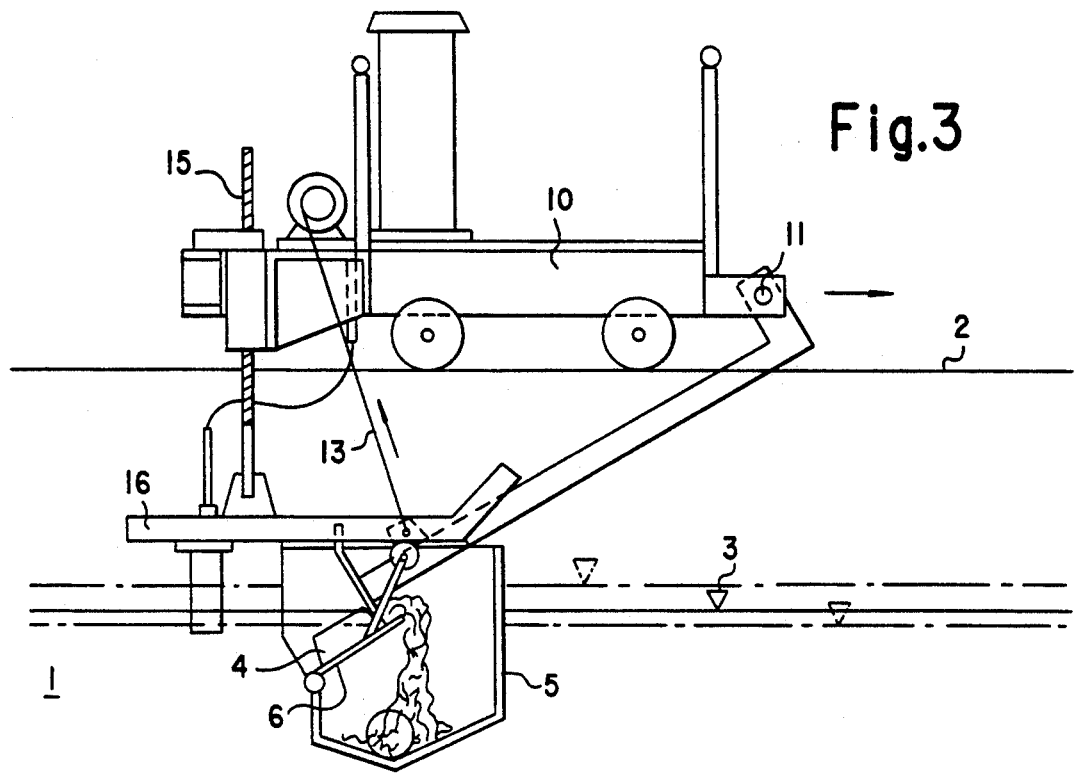
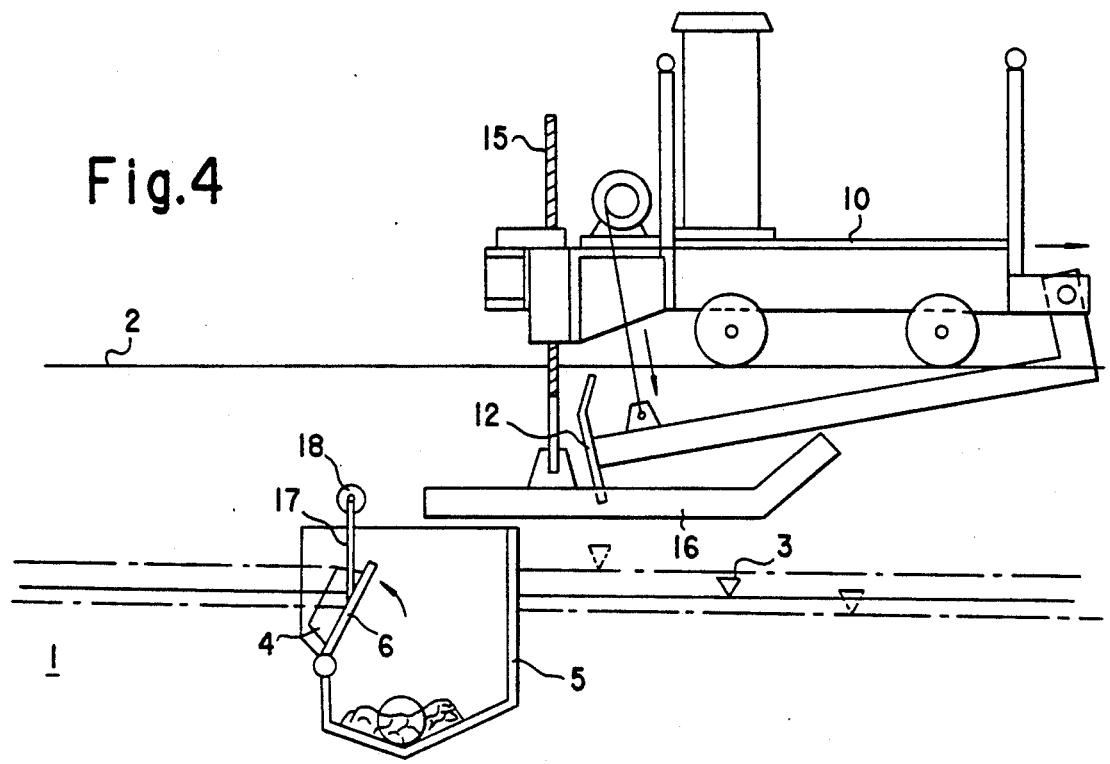

METHOD FOR EVACUATING FLOATING SLUDGE FROM SETTLING TANKS AND THICKENER TANKS

FIELD OF THE INVENTION

The invention relates to a method for evacuating all types of floating sludge from settling tanks and thickener tanks.

BACKGROUND OF THE INVENTION

It is known to push the floating sludge together between floating sludge drain and floating sludge scraper and to evacuate it by lowering the intake edge of the drain. In this manner, the floating sludge cannot evade evacuation. By lowering the intake edge, an evacuating pressure is created causing the quick and complete evacuation of the floating sludge.

It has been found that this evacuating method with a stationary drain located at the end of the tank, which is used in longitudinal-type tanks, still is not the optimum solution. The long evacuating path allows that floating sludge evades the evacuating process underneath the scraper.

SUMMARY OF THE INVENTION

In order to solve this problem, a floating sludge drain is assumed whose intake edge may be lowered when the scraper is approaching.

The water level in the settling tanks is subject to considerable variations. Accordingly, the path to be travelled downward by the intake edge for complete evacuation of the floating sludge has to be adjusted. In the known floating sludge evacuating device, the intake edge of the drain formed as pivoting flap is forced downward along a constant path by means of a guide rail mounted on the scraper bridge. When operating this evacuating device it has been discovered that with varying water levels either too little floating sludge, or too much water together with the sludge will be evacuated. The object of eliminating this and the aforementioned flaw is achieved in that in order to evacuate the tank surface by sections, the scraper blade is lifted repeatedly, advanced to a position remote from the drain where it is stopped and lowered, while the drain follows the scraper blade and pushes the floating sludge together, and that, during approach of the stationary scraper blade and prior to the lowering motion causing the floating sludge to be evacuated, the intake edge of the drain is pre-lowered to a position which takes the level in the tank into account, and that it will subsequently be lowered by the preset distance so as to evacuate the floating sludge. Preferably, pre-lowering will not occur until the scraper blade has arrived at the area of the drain. This will ensure in any operating conditions that the intake edge is lowered to the correct extent and at the correct time. Preferably, pre-lowering and lowering will have already been concluded before the end of the push-together motion so that there will remain a residual motion for the push-in of the floating sludge by means of the scraper blade. The travel motion of the drain is not interrupted during evacuation. The scraper blade mounted on a separate bridge has a freewheeling mechanism so that it may be carried along by the main bridge in a non-driven state until it is lifted again and advanced rapidly.

In circular and annular tanks, which are preferably provided with several stationary floating sludge drains and a circulating scraper blade disposed on a bridge, the invention is implemented in that the scraper blade is invariably lowered into the floating sludge behind a drain that has been passed overhead, moved on to the next drain where it is lifted again after the floating sludge has been pushed into the drain, and that also in this case, during approach of the scraper blade and prior to the lowering motion causing the floating sludge to be evacuated, the intake edge will be pre-lowered to a position which takes the level in the tank into account.

For pre-lowering of the intake edge the water level has to be detected.

Preferably, the detecting unit is formed as pressure gage chamber moved into the floating sludge layer from above together with the lowering unit for the intake edge. As soon as the preset pressure is reached, the lowering drive is shifted to the preset lowering path for evacuation.

It is convenient to use floats for holding the intake edge of the drain in the highest position determined by the water level. After it has pushed the floating sludge into the drain, the scraper blade is set to lifting by a non-contact proximity switch, and lowered again behind the drain by a second proximity switch.

BRIEF DESCRIPTION OF THE DRAWINGS

Preferred embodiments of the method according to the invention will be set forth hereinafter with reference to the figures wherein:

FIG. 3 shows the same device during sludge evacuation;

FIG. 4 shows the same device after the drain has been passed;

DETAILED DESCRIPTION OF THE PREFERRED EMBODIMENTS

Figure 1:
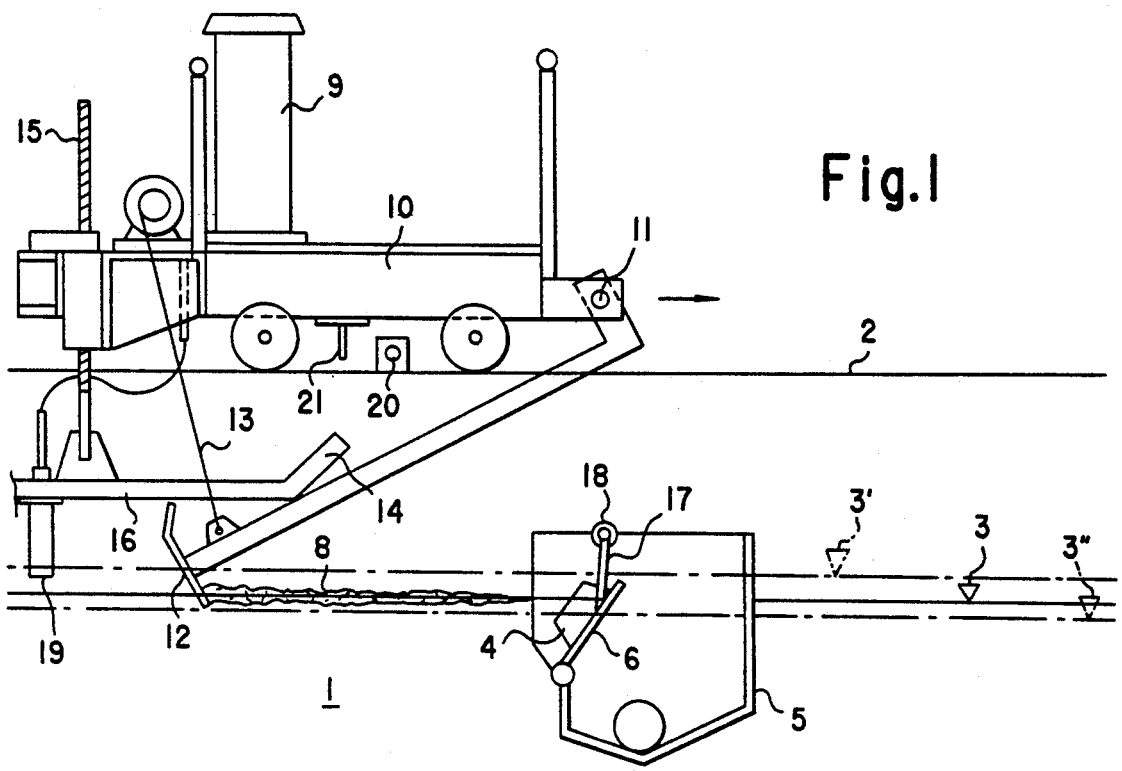
FIG. 1 shows a scraper bridge for a fixed floating sludge drain in a starting position.

Of the longitudinal-type or circular (annular) settling tank 1 shown in FIG. 1, only the crest 2 of the tank, the water level 3 and a stationary floating sludge drain 5 are visible. The intake edge of the drain 5 is formed as pivoting flap 6 held by a float 4 in its uppermost closing position in which no water and no floating sludge may flow into the drain. Pivoting flap and float are formed in a way that the drain will be closed even in the case of the highest possible level 3'. The floating sludge drain 5 is connected to an external collecting pipe (not shown) into which the sludge is discharged. A finger 17 with a pressure roller 18 projects upward from the pivoting flap 6.

Hinged at the scraper bridge 10 in point 11, the scraper blade 12, which may be lifted and lowered via the traction rope 13, serves as evacuating element. In addition, a push-down unit for the pivoting flap 6, which consists of a horizontally running guide link 16 with a front buffer ramp 14 and a driven helical spindle 15, is mounted on the scraper bridge 10. In addition, a pressure gage chamber 19 used to detect the sludge/water level 3 is connected to the guide link. The measuring signals are processed in the switchgear cubicle 9 and passed on to the drives for scraper blade and guide link.

Figure 2:
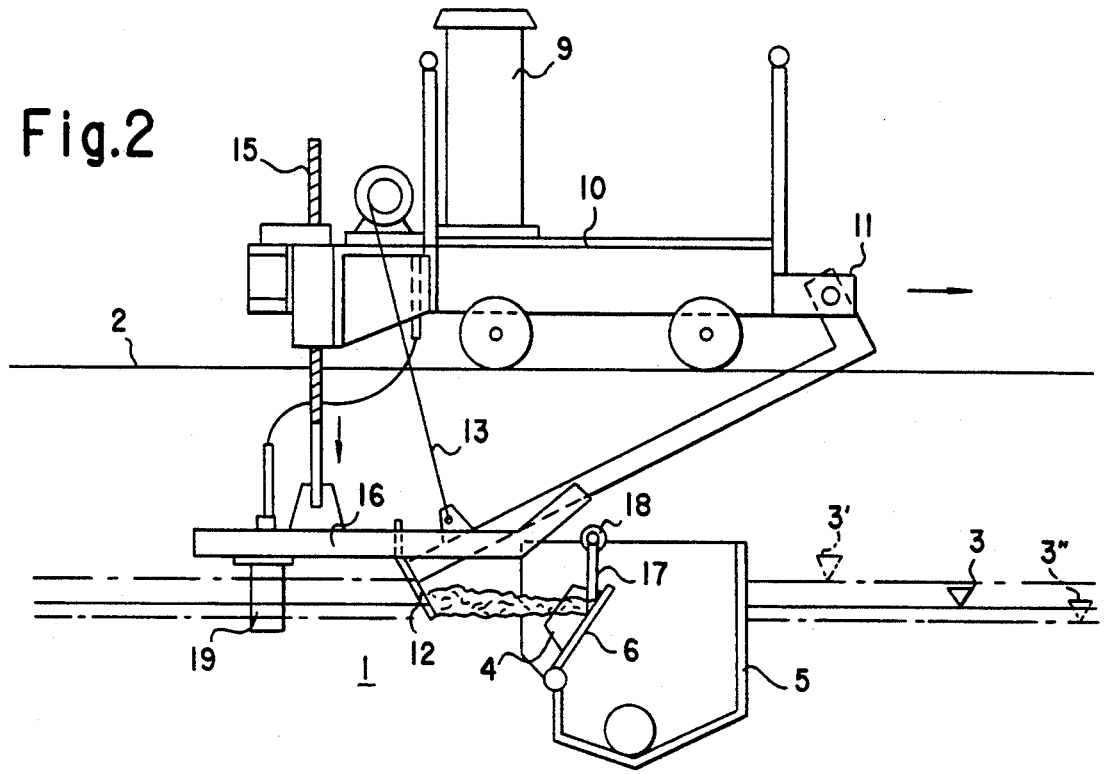
FIG. 2 shows the scraper bridge of FIG. 1 in a more advanced position.

The program for floating sludge evacuation is triggered by a proximity switch 20 with switching flag 21, at a time when the floating sludge 8 has been sufficiently pushed together and when the guide link 16 has approached the pressure roller 18 (FIG. 1). Now, the pressure gage chamber is moved downward together with the guide link, and the pressure is measured (FIG. 2). As soon as the preset pressure has been reached, lowering of the guide link 16 by the preset distance and down to the lowermost position shown in FIG. 2 will begin. The bridge continues to travel into the position shown in FIG. 3; during this process the pivoting flap is forced downward by the guide link until practically the entire amount of floating sludge will be scraped into the drain 5 (FIG. 3). Shortly behind the pivoting flap the scraper blade is pulled upwards by the rope 13 until it may pass over the drain (FIG. 4). At the same time, the guide link 16 leaves the pressure roller 18 so that driven by the float, the pivoting flap 6 may pivot upwards into the closing position. Subsequently, also the guide link 16 with the pressure gage chamber 19 will be lifted back into the upper rest position (not shown).

A modified form of this invention is also suitable for scraper bridges where the drain is attached to the bridge (FIGS. 5 to 8).

The same parts as in FIGS. 1 to 4 are referenced by the same numerals.

The drain 5 is attached to the bridge 10 by means of struts 25 so that the pivoting flap 6 held up by floats 4 will prevent the influx of sewage and sludge.

In addition to this main bridge a forerunner bridge 30 is provided which is mounted on the pivot of the main bridge and has a separate drive (not shown). On its side facing forward into the moving direction of the main bridge, the forerunner bridge 30 again is provided with the guide link 16 including lowering drive 15 and pressure gage chamber 19. In this case, the scraper blade 12 is mounted on angle sections 31 whose height may be adjusted synchronously by means cables 32 and which are guided in slip-in guides 33.

Figure 5:
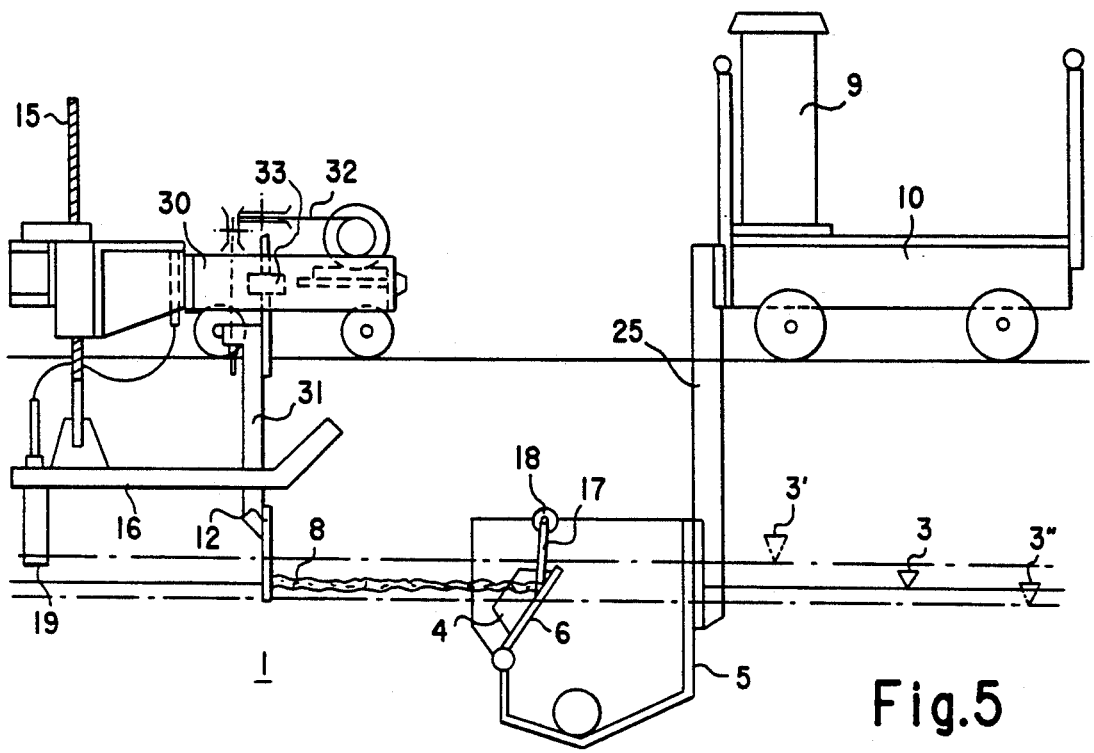
FIG. 5 shows a second embodiment having two traversing bridges in their approaching position.
Figure 6:
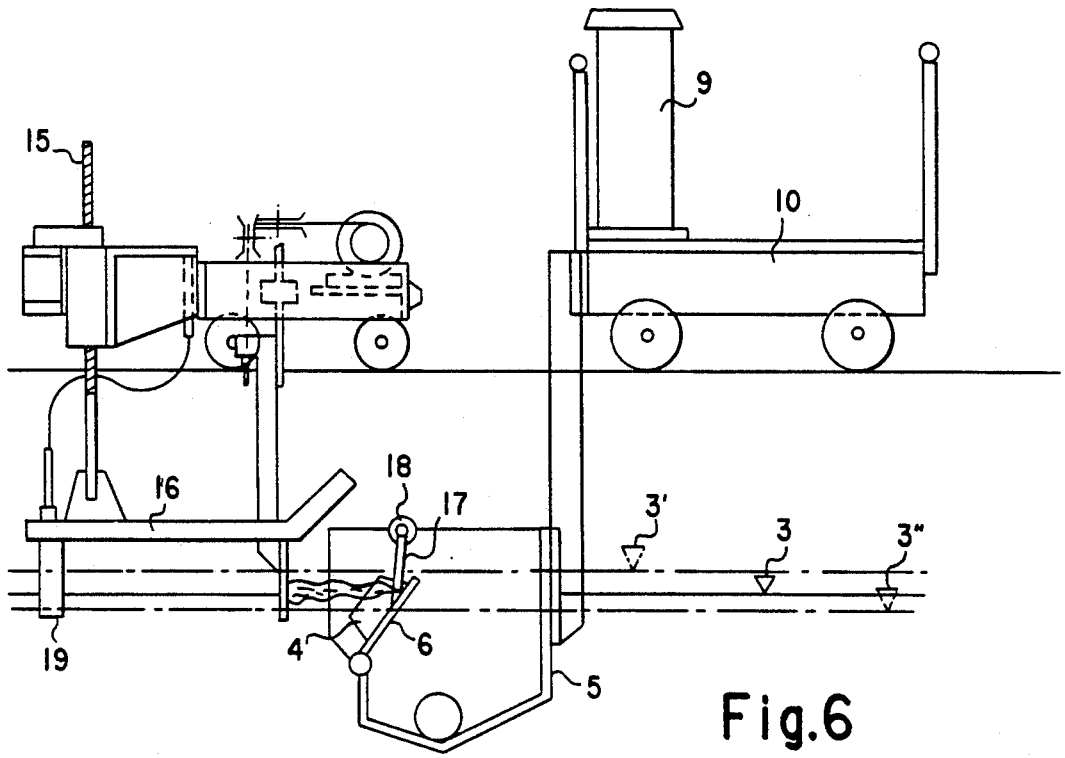
FIG. 6 shows the device of FIG. 5 prior to the start of the pre-lowering of the intake edge.

Clearing procedure is as follows:

The forerunner bridge 30 advances to the position shown in FIG. 5 where it is stopped. The scraper blade 12 is lowered so that the floating sludge will be pushed together between the intake edge 6 of the drain 5 and the traveling scraper blade. Upon approach of the main bridge, at first the lowering drive 15 for the guide link 16 is triggered, and the pressure gage chamber 19 is immersed into the water level until the preset pressure value is reached. Then, the preset path for opening the intake edge will be travelled (FIG. 6).

Figure 7:
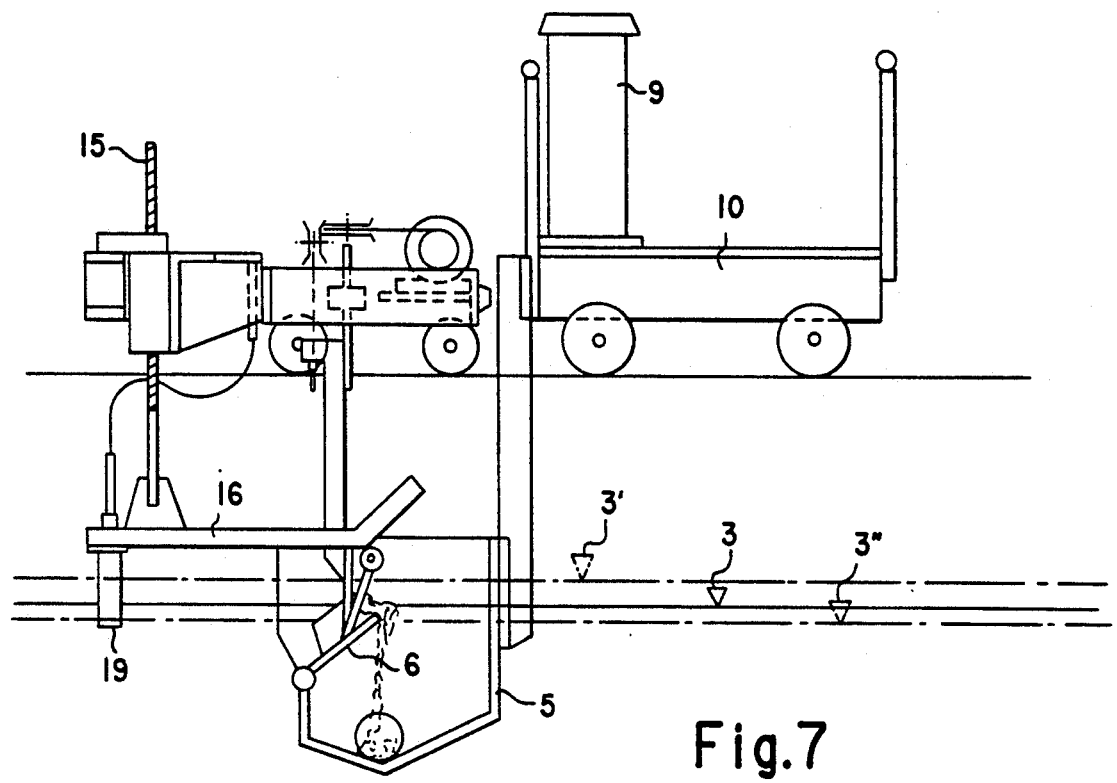
FIG. 7 shows the same device during floating sludge evacuation.
Figure 8:
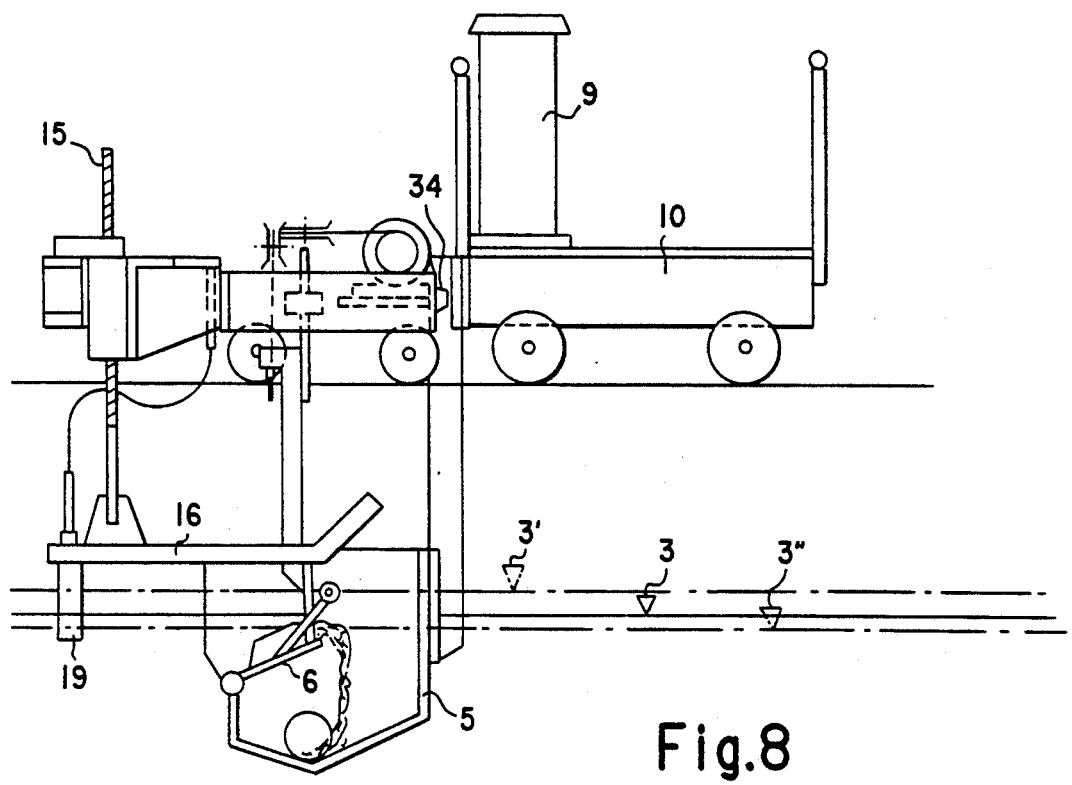
FIG. 8 shows the same device at the end of the floating sludge evacuation.

In the position of FIG. 7 the guide link 16 has forced the pivoting flap 6 downward far enough that a part of the floating sludge has already gotten into the drain. Subsequently (FIG. 8), also the lower edge of the scraper blade will be effective and force the pivoting flap further open so that also the rest of the floating sludge will be pushed into the drain. In this position, evacuating operation will be completed. The forerunner bridge is taken along in the free-wheeling mode by the main bridge by means of a buffer 34 until the drive of the forerunner bridge receives the pulse for rapid advance and the scraper blade the pulse for lifting. Control of the lowering drive and the scraper blade is conducted from the main bridge.

I claim:

1. A method for evacuating sludge floating on a liquid from a settling or thickener tank by sections of the tank wherein the floating sludge is pushed together between a scraper blade and a sludge drain and wherein the sludge drain includes an intake edge adjacent the pushed together floating sludge which is lowered relative to a liquid level of the tank by a push-down unit attached to the scraper blade and then by the scraper blade engaging therewith, said method comprising the steps of:
    a) lifting the scraper blade which is adjacent the sludge drain, after evacuation of a section of the tank, above a level of the sludge in an adjacent section of the tank;
    b) advancing the scraper blade to a position in the adjacent section remote from the sludge drain;
    c) lowering the scraper blade at the position;
    d) following the scraper blade with the sludge drain in the liquid so that the sludge in the adjacent section between the scraper blade and the sludge drain is pushed together therebetween;
    e) causing the sludge drain to approach the scraper blade and lowering the push-down unit of the scraper blade to a predetermined position relative to the liquid level;
    f) pre-lowering the intake edge of the sludge drain by the push-down unit at the predetermined position as the sludge drain is moved closer to the scraper blade;
    g) further lowering the intake edge with the scraper blade as the sludge drain continues to move so that the sludge is evacuated into the sludge drain; and
    h) repeating steps a-g to evacuate sludge from a subsequent section of the tank.

2. A method for evacuating sludge as claims in claim 1 wherein said following step includes the step of moving the sludge drain continuously; and further including, after said further lowering the intake edge step, a step of moving the scraper blade along with the sludge drain prior to repeating said lifting step.

3. A method for evacuating sludge as claimed in claim 2 wherein said sludge drain is located on a first bridge and said scraper blade is located on a second bridge, and wherein said following step includes the step of moving the first bridge by a main drive and said advancing step includes the step of moving the second bridge by a second drive therefor separate from the main drive.

4. A method for evacuating sludge as claimed in claim 1 wherein said pre-lowering step includes the step of moving the intake edge of the sludge drain from an upper end position located above a maximum sludge level.

5. A method for evacuating sludge as claimed in claim 1 wherein said following step includes the step of holding the intake edge of the sludge drain in a closed position relative to the liquid level by floats.

6. A method for evacuating sludge as claimed in claim 1 wherein the push-down unit includes a leading buffer ramp and a following guide link and wherein the intake edge of the sludge drain is pivotable and further includes an arm and a sliding roller supported by the arm; and wherein said pre-lowering step includes the step of pivoting the intake edge by engaging the sliding roller with the buffer ramp and then the guide link.

7. A method for evacuating sludge as claimed in claim 6 wherein the lowering the push-down unit step includes the step of detecting the liquid level with a pressure gage chamber projecting downward from the guide link.

8. A method for evacuating sludge as claimed in claim 7 wherein the lowering the push-down unit step includes the steps of activating a downward movement of the push-down unit when a proximity switch is tripped by the approach of the sludge drain relative to the scraper blade and stopping of the downward movement when the pressure gage chamber detects the liquid level.

9. A method for evacuating sludge as claimed in claim 6 and further including, after the further lowering of the intake edge step, a step of returning the intake edge to a closed position after the guide link no longer engages the sliding roller.

10. A method for evacuating sludge floating on a liquid from a settling or thickener tank by sections of the tank wherein the floating sludge is pushed together between a moving scraper blade and a plurality of stationary floating sludge drains and wherein each sludge drain includes an intake edge adjacent the pushed together floating sludge which is lowered relative to a liquid level of the tank by a push-down unit attached to the scraper blade and then by the scraper blade engaging therewith, said method comprising the steps of:
 a) lifting the scraper blade which is adjacent a sludge drain, after evacuation of a section of the tank, above a level of the adjacent sludge drain;
 b) lowering the scraper blade in a subsequent section of the tank behind a sludge drain over which the scraper blade has been passed;
 c) moving the scraper blade toward the next subsequent sludge drain in the liquid so that the sludge in the subsequent section between the scraper blade and the next subsequent sludge drain is pushed together therebetween; pl d) causing the scraper blade to approach the next subsequent sludge drain and lowering the push-down unit of the scraper blade to a predetermined position relative to the liquid level;
 e) pre-lowering the intake edge of the next subsequent sludge drain by the push-down unit at the predetermined position as the scraper blade is moved closer to the next subsequent sludge drain;
 f) further lowering the intake edge with the scraper blade as the scraper blade continues to move so that the sludge is evacuated into the next subsequent sludge drain; and
 g) repeating steps a-f to evacuate sludge from a subsequent section of the tank.

11. A method for evacuating sludge as claimed in claim 10 wherein the scraper blade includes a drive for lifting and lowering the scraper blade; and wherein said lifting step includes the step of activating the drive for a lifting movement of the scraper blade when a proximity switch is tripped by the approach of the scraper blade relative to the subsequent sludge drain, and wherein said lowering the scraper blade step includes the step of activating the drive for a lowering movement of the scraper blade when a proximity switch is tripped by the passing over of the scraper blade relative to the subsequent sludge drain.

* * * * *